(12) United States Patent
Thurgate

(10) Patent No.: US 11,875,091 B2
(45) Date of Patent: Jan. 16, 2024

(54) METHOD FOR DATA-DRIVEN COMPARISON OF AERODYNAMIC SIMULATIONS

(71) Applicant: TOYOTA MOTOR ENGINEERING & MANUFACTURING NORTH AMERICA, INC., Plano, TX (US)

(72) Inventor: Brian T. Thurgate, Ypsilanti, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 249 days.

(21) Appl. No.: 16/561,422

(22) Filed: Sep. 5, 2019

(65) Prior Publication Data

US 2021/0073351 A1    Mar. 11, 2021

(51) Int. Cl.
| | |
|---|---|
| *G06F 7/48* | (2006.01) |
| *G06F 30/15* | (2020.01) |
| *G01M 9/08* | (2006.01) |
| *G07C 5/08* | (2006.01) |
| *G06T 7/564* | (2017.01) |
| *G06F 30/333* | (2020.01) |

(52) U.S. Cl.
CPC .............. *G06F 30/15* (2020.01); *G01M 9/08* (2013.01); *G06T 7/564* (2017.01); *G07C 5/0808* (2013.01); *G06F 30/333* (2020.01)

(58) Field of Classification Search
CPC .... G06F 30/15; G06F 30/333; G06F 2113/08; G06F 30/28; G01M 9/08; G07C 5/0808; G06T 7/564; Y02T 90/00
See application file for complete search history.

(56) References Cited

U.S. PATENT DOCUMENTS

| | | |
|---|---|---|
| 5,801,969 A | 9/1998 | Nagahama |
| 7,424,413 B2 | 9/2008 | Brooke et al. |
| 9,183,326 B2 | 11/2015 | de Prisco et al. |
| (Continued) | | |

OTHER PUBLICATIONS

Edeling, Wouter Nico, Pasquale Cinnella, Richard P. Dwight, and Hester Bijl. "Bayesian estimates of parameter variability in the k-ε turbulence model." (Elsevier Inc., 2014) Journal of Computational Physics 258, pp. 73-94. http://dx.doi.org/10.1016/j.jcp.2013.10.027 (Year: 2014).*

(Continued)

*Primary Examiner* — Rehana Perveen
*Assistant Examiner* — Nithya J. Moll
(74) *Attorney, Agent, or Firm* — HAYNES AND BOONE, LLP

(57) ABSTRACT

Disclosed is a method for evaluating computational fluid dynamic simulation results. The method includes, based on a set of initial conditions, performing a first baseline run and a second baseline run of a simulated area or volume containing a vehicle body shape, and then performing a change run of the simulated area or volume containing a modified vehicle body shape, and performing the following actions within the simulated area or volume: plotting an iso line of the first baseline run and a corresponding iso line of the second baseline run, plotting an iso line of the change run that corresponds to the iso line of the two baseline runs, and comparing whether the iso line of the change run falls between the iso lines of the two basline runs. If not, then the modification to the vehicle body shape may be considered significant.

20 Claims, 11 Drawing Sheets

(56) References Cited

U.S. PATENT DOCUMENTS

| | | | |
|---|---|---|---|
| 10,303,825 B2 | 5/2019 | Rao et al. | |
| 2010/0318327 A1* | 12/2010 | Holden | G06F 30/15 703/1 |
| 2013/0204593 A1 | 8/2013 | Doorhy et al. | |
| 2015/0134123 A1 | 5/2015 | Obinelo | |
| 2016/0273562 A1* | 9/2016 | Seifert | F15D 1/008 |
| 2017/0370751 A1* | 12/2017 | Mann | G10K 11/16 |
| 2020/0364388 A1* | 11/2020 | Umetani | G06T 19/20 |

OTHER PUBLICATIONS

Tracey, Brendan, Karthik Duraisamy, and Juan Alonso. "Application of supervised learning to quantify uncertainties in turbulence and combustion modeling." (American Institute of Aeronautics,2013) In 51st AIAA Aerospace Sciences Meeting, AIAA 2013-0259. pp. 1-18. DOI: 10.2514/6.2013-259 (Year: 2013).*

Aprovitola, Andrea, et al. "Multidisciplinary Design of Reusable Re-Entry Vehicles by Optimization and Computational Fluid Dynamics." (2017).*

Al-Saadi, Ahmed Ali Shakir. Analysis of Novel Techniques of Drag Reduction and Stability Increase for Sport Utility Vehicles using Computational Fluid Dynamics. Diss. University of Leeds, 2019.*

Salehi, Saeed, et al. "Efficient uncertainty quantification of stochastic CFD problems using sparse polynomial chaos and compressed sensing." Computers & Fluids 154 (2017): 296-321.*

* cited by examiner

METHOD FOR DATA-DRIVEN COMPARISON OF AERODYNAMIC SIMULATIONS

TECHNICAL FIELD

The subject matter described herein relates to a method for quantifying expected differences between computational fluid dynamic simulations of a vehicle body. This method has particular but not exclusive utility for the evaluation of motor vehicle body designs.

BACKGROUND

The computational fluid dynamics (CFD) may be used for example in assessing different cooling configurations for an HVAC system, and for assessing the fluid properties of dynamic components such as propellers and valves. In the automotive industry, CFD is employed to evaluate the airflow and drag characteristics of different vehicle body designs without the need for wind tunnel testing of physical models. CFD may be used in particular to determine which of two or more body designs has the most favorable flow and drag characteristics. Such CFD simulations, however, have numerous drawbacks, including run-to-run variability even when the vehicle body design and simulation conditions are identical.

Aerodynamic CFD simulations of vehicle bodies in the automotive industry are performed using cellular automaton type simulations (e.g., lattice Boltzmann type) using software tools such as PowerFLOW. However, because such systems rely on inherently transient solvers, there is very often a difference between successive runs, even when the same geometry is run with the same conditions and settings. Therefore, it can be difficult to determine what is a true flow variation due to changes in vehicle body geometry and what is just "noise" due to natural or statistical variance in the simulation. All transient CFD solvers with run-to-run variation may exhibit this problem.

Traditionally, these run-to-run differences are assessed based on the intuition and experience of engineers, who decide what is a meaningful change vs. what is "noise". Often this means concentrating on differences that occur in (and downstream of) areas where changes are made. However, such judgments are subjective and may be susceptible to confirmation bias. In design environments where every flow difference is considered "significant", two issues are commonplace: 1) reduced trust in CFD results, since flow differences may be seen in areas unrelated to the parts being studied or modified, and 2) improper or premature conclusions based on mistaking normal run-to-run variation for meaningful design differences. In design environments where flow differences are judged insignificant, engineers run the risk of failing to notice or acknowledge changes in a vehicle body design that do in fact yield meaningful differences in drag or airflow. This can add costs and reduce vehicle gas mileage. Accordingly, a need exists for improved CFD processes and methods that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed is a method for quantifying expected differences between computational fluid dynamic (CFD) simulations of a vehicle body, hereinafter referred to as a CFD iso line boundary method. The CFD iso line boundary method disclosed herein has particular, but not exclusive, utility for the design of aerodynamic shapes for automobile and truck bodies and body parts. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The CFD iso line boundary method includes a method for evaluating computational fluid dynamic simulation results, the method including: receiving a set of initial conditions; based on the set of initial conditions, performing a first baseline run and a second baseline run of a simulated area or volume containing a first vehicle body shape; based on the set of initial conditions, performing a change run of the simulated area or volume containing a second vehicle body shape; and within the simulated area or volume: plotting an iso line of the first baseline run and a corresponding iso line of the second baseline run; plotting an iso line of the change run that corresponds to the iso line of the first baseline run and the iso line of the second baseline run; and comparing the iso line of the change run to the iso line of the first baseline run and the iso line of the second baseline run. Other embodiments of this aspect include corresponding computer systems, apparatus, and computer programs recorded on one or more computer storage devices, each configured to perform the actions of the methods.

Implementations may include one or more of the following features. The method further including, based on the comparing: accepting the second vehicle body shape as significant if at least part of the iso line of the change run does not fall between the iso line of the first baseline run and the iso line of the second baseline run; and rejecting the second vehicle body shape as insignificant if the iso line of the change run falls entirely between the iso line of the first baseline run and the iso line of the second baseline run. The method further including accepting the second vehicle body shape as final if an output of the change run meets a design criterion. Implementations of the described techniques may include hardware, a method or process, or computer software on a computer-accessible medium.

One general aspect includes a method for evaluating computational fluid dynamic simulation results, the method including: providing a first vehicle body shape or portion of a vehicle body shape to be simulated; providing a set of initial conditions; performing at least three baseline runs of a simulated area or volume containing the first vehicle body shape using the set of initial conditions; performing a change run of the simulated area or volume containing a second vehicle body shape using the set of initial conditions; and for each point within the simulated area or volume: defining a mean expectation line of averages of an iso line from each of the at least three baseline runs, and plotting a confidence interval around the mean expectation line; plotting an iso line of the change run that corresponds to the iso lines from each of the at least three baseline runs; comparing the iso line of the change run to the confidence interval. Other embodiments of this aspect include corresponding computer systems, apparatus, and computer programs recorded on one or more computer storage devices, each configured to perform the actions of the methods.

Implementations may include one or more of the following features. The method further including, based on the comparing: accepting the second vehicle body shape as significant if at least part of the iso line of the change run does not fall within the confidence interval; and rejecting the second vehicle body shape as insignificant if the iso line of the change run falls entirely outside the confidence interval. The method further including, if the vehicle body shape is accepted as significant, accepting the second vehicle body shape as a final output if an output of the change run meets a design target. The method where the confidence interval is defined as the absolute value of the greatest distance between the mean expectation line and any of the averaged iso lines. The method where the confidence interval is defined as plus or minus an absolute value of a standard deviation of distances between the mean expectation line and the averaged iso lines. The method where the confidence interval is defined as plus or minus two times an absolute value of a standard deviation of distances between the mean expectation line and the averaged iso lines. The method where the confidence interval is defined as plus or minus three times an absolute value of a standard deviation of distances between the mean expectation line and the averaged iso lines. Implementations of the described techniques may include hardware, a method or process, or computer software on a computer-accessible medium.

One general aspect includes a system for testing the fluid dynamic characteristics of body shapes of a vehicle, the system including: a processor including: a memory, a display, a user interface configured to receive inputs from a user, where the processor is configured to: receive a first body shape of a vehicle to be simulated; receive a set of initial conditions; perform at least two baseline runs of a simulated area or volume containing the first body shape of the vehicle using the set of initial; perform a change run using a second vehicle body shape using the set of initial conditions; and for each point within the simulated area or volume: define a mean expectation line of averages of an iso line from each of the at least two baseline runs, and plot a confidence interval around the mean expectation line; plot an iso line of the change run that corresponds to the iso lines from each of the at least two baseline runs; and compare the iso line of the change run to the confidence interval. Other embodiments of this aspect include corresponding computer systems, apparatus, and computer programs recorded on one or more computer storage devices, each configured to perform the actions of the methods.

Implementations may include one or more of the following features. The system where the processor is further configured to, based on the comparing: accept the second vehicle body shape as significant if at least part of the iso line of the change run does not fall within the confidence interval; and reject the second vehicle body shape as insignificant if the iso line of the change run falls entirely outside the confidence interval. The system where the processor is further configured to, if the second vehicle body shape is accepted as significant, accept the second vehicle body shape as a final output if an output of the change run meets a design target. The system where the confidence interval for each point along the mean expectation line is defined as the absolute value of the greatest distance between the mean expectation line and any of the averaged iso lines. The system where the confidence interval for each point along the mean expectation line is defined as plus or minus an absolute value of a standard deviation of distances between the mean expectation line and the averaged iso lines. The system where the confidence interval for each point along the mean expectation line is defined as plus or minus two times an absolute value of a standard deviation of distances between the mean expectation line and the averaged iso lines. The system where the confidence interval for each point along the mean expectation line is defined as plus or minus three times an absolute value of a standard deviation of distances between the mean expectation line and the averaged iso lines. The system further including the vehicle. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the CFD iso line boundary method, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
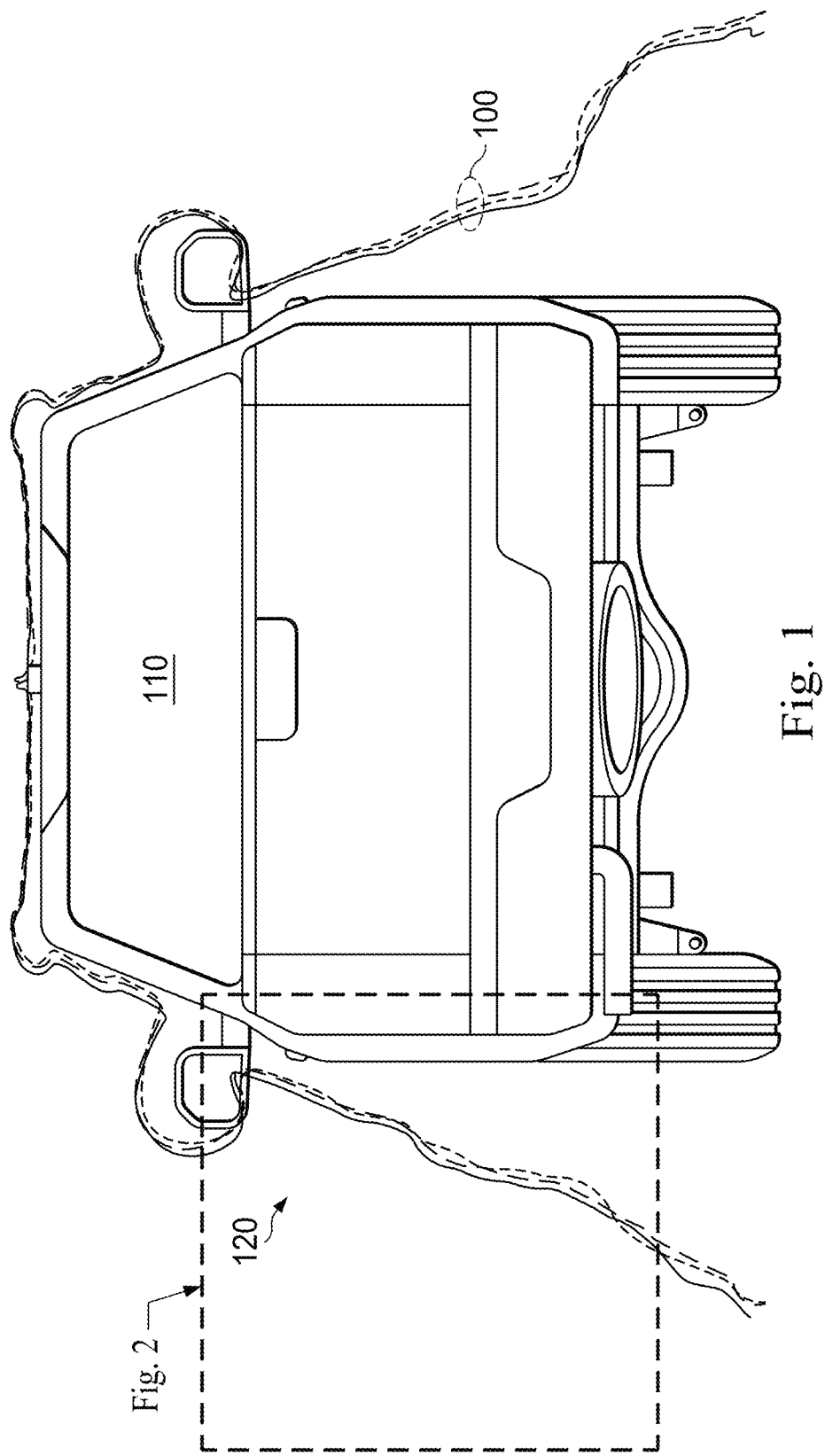
FIG. 1 is a representation of three instances of an example aerodynamic boundary layer surrounding an example vehicle, as determined by a CFD simulation, in accordance with at least one embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

In accordance with at least one embodiment of the present disclosure, a CFD iso line boundary method is provided which permits an algorithm, engineer, or other user to evaluate the changes that appear in a CFD model when a change in vehicle body design is implemented. The CFD iso line boundary method helps to quantify which changes in airflow or drag are statistical noise introduced by the transient CFD solver, and which changes are meaningful results of the altered vehicle body design.

Traditionally, run-to-run differences for a CFD model of an altered body design are assessed based on the intuition and experience of engineers, who typically concentrate on differences that occur in (and downstream of) areas where changes are made, and ignore drag and airflow differences around (and downstream of) other portions of the vehicle body. However, such judgments are subjective and may be highly susceptible to confirmation bias, reduced trust in CFD results, improper or premature conclusions, and failure to notice or acknowledge some meaningful changes.

By creating a reference image or reference markings (e.g., iso lines) showing expected stochastic variation for a given vehicle model and set of initial conditions, the present disclosure can eliminate much of the guesswork associated with interpreting CFD results. This may not only lessen the workload for engineers, but also improve overall effectiveness of the CFD simulation by reducing the time spent chasing false leads.

A heat map is a representation of a variable in space. Heat maps are used to better understand spatial relationships for the variable, and draw attention to regions of greater significance and away from regions of lesser significance. Examples of heat maps include 2D and 3D maps for a given variable in a CFD simulation volume (e.g., a scalar velocity at each X-Y coordinate). Heat maps may be marked or annotated with iso lines, which trace 2D contours where the plotted variable (e.g., a scalar velocity) holds a particular value. Typically, the variable is higher than the particular value on one side of the iso line, and lower than the particular value on the other side of the iso line, although in some cases the iso line may represent a local minimum or maximum. A complete iso line may be drawn across all portions of the simulated area or volume where it appears, or spatial limits may be placed on an iso line segment such that, for example, only iso line points within one meter of the surface of the vehicle body are shown. Multiple iso lines or iso line segments can be drawn for a single heat map, and iso lines for multiple heat maps (e.g., from two or three or more different simulations) can be shown in a single image.

In some embodiments, a range can be shown for the location of an iso line across multiple baseline simulation runs using the same vehicle body shape and initial conditions. This has the effect of showing the range of run-to-run variation for the location of that iso line. This may take many forms, such as a set of reference lines or markers that can be overlaid onto the output of other simulations (e.g., simulations wherein the vehicle body shape has been altered in an attempt to achieve a design target such as drag reduction). These reference lines or markers can then be used by an engineer or algorithm to judge if the change from the baseline falls within "normal" variation, or if it is in fact a meaningful change. In other embodiments, simple comparison tools can be built either by making simple overlays or through a more automated process. The key is that a baseline run must be executed at least twice, and preferably many times, to provide understanding of the run-to-run variation. When analyzing CFD results of a change in vehicle body shape, these iso line range markers could be queried (either by a human or by an algorithm) to determine the likelihood that a given change is simply normal statistical variation, or whether it is a meaningful and actionable difference.

By referring to the iso line range markers, engineers and engineering algorithms have an easy reference to tell what is expected or acceptable as run-to-run variation, and what is a meaningful change. The more easily this can be applied to the current run (such as something that can be overlaid, or a quantification of differences expected), the easier the analysis becomes, and more confidence can be placed in the CFD results. Accordingly, statistical CFD is employed to create a statistical boundary model or image overlay markers for a particular vehicle body under a particular set of conditions. Using the statistical boundary model or image overlay markers as a comparison for CFD flow models around an altered body form, engineers and other users are provided with a straightforward reference indicating which differences are to be considered. Altered flow parameters (e.g., iso lines) that fall outside the identified statistical boundaries or image overlay markers may be considered meaningful, whereas altered flow parameters that fall within the identified statistical boundaries or image overlay markers may be considered "noise."

The present disclosure aids substantially in the quantitative evaluation of changes in a motor vehicle body design, by improving understanding of the expected range of statistical run-to-run variation in the CFD simulation due to solver noise. Implemented on a processor in communication with a video display, the CFD iso line boundary method disclosed herein provides thresholds for which flow differences should be analyzed and which should be ignored as noise. This improved analysis of CFD results transforms a process of guesswork and intuition into a simple numerical comparison of change magnitudes, without the normally routine need to perform multiple confirmation runs and/or apply subjective engineering judgment. This unconventional approach improves the functioning of the CFD-assisted design process, by providing greater confidence in CFD results without requiring significant additional human labor or processing time.

The CFD iso line boundary method may be implemented as an image overlay superimposed on the CFD results. The image overlay is viewable on a display, and operated by a control process executing on a processor that accepts user inputs (e.g., from a keyboard, mouse, or touchscreen interface), and that is in communication with one or more CFD simulations or the outputs thereof. In that regard, the control process performs certain specific operations in response to different inputs or selections made at different times during the design and analysis process. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the CFD iso line boundary method. Certain features may be added, removed, or modified without departing from the spirit of the claimed subject matter.

FIG. 1 is a representation of three instances of an example aerodynamic boundary layer 100 surrounding an example vehicle 110, as determined by a CFD simulation, in accordance with at least one embodiment of the present disclosure. The boundary layer is the point at which air flow relative to the vehicle is close to zero, e.g., the region or layer in which the air remains essentially attached to the vehicle rather than static with the landscape through which the vehicle 110 is moving. In general, a smaller boundary layer is associated with lower drag and therefore greater fuel economy. A detail box 120 is marked for closer view. The boundary layer may, for example, be identified by an iso-velocity line representing zero velocity or a small but nonzero velocity.

Before continuing, it should be noted that the examples described above are provided for purposes of illustration, and are not intended to be limiting. Other devices and/or device configurations may be utilized to carry out the operations described herein.

Figure 2:
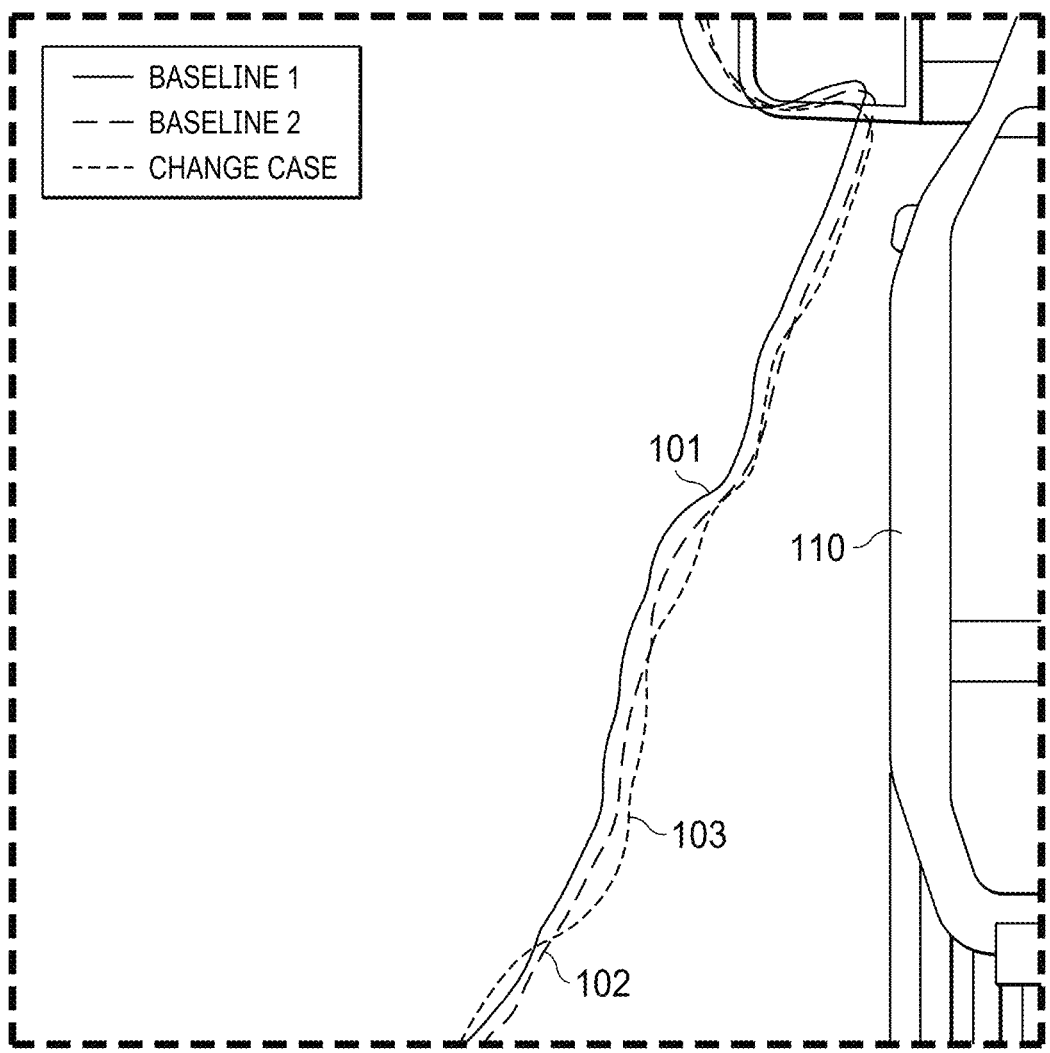
FIG. 2 is a representation of three instances of an example aerodynamic boundary layer surrounding an example vehicle, as determined by a CFD simulation, in accordance with at least one embodiment of the present disclosure.

FIG. 2 is a representation of three instances of an example aerodynamic boundary layer 100 surrounding an example vehicle 110, as determined by a CFD simulation, in accordance with at least one embodiment of the present disclosure. This view is a closer view of the detail box 120 from FIG. 1, and shows more clearly three separate boundary layers: a Baseline #1 case 101, a Baseline #2 case 102 that was run with identical settings and inputs but exhibits small run-to-run differences, and a Change Case 103, that represents the boundary layer for a slightly adjusted aerodynamic shape for the vehicle 110. Such cases are sometimes referred to as "countermeasure" cases, because they include proposed design changes intended to alleviate a known problem, such as turbulence (and therefore drag) downstream of a vehicle body part (e.g., a door handle, side view mirror, or bumper). In this example, the countermeasure case 103 shows the boundary layer being closer to the vehicle in several key locations than either of the baseline cases 101 or 102. This may be consistent with reduced drag.

Figure 3A:
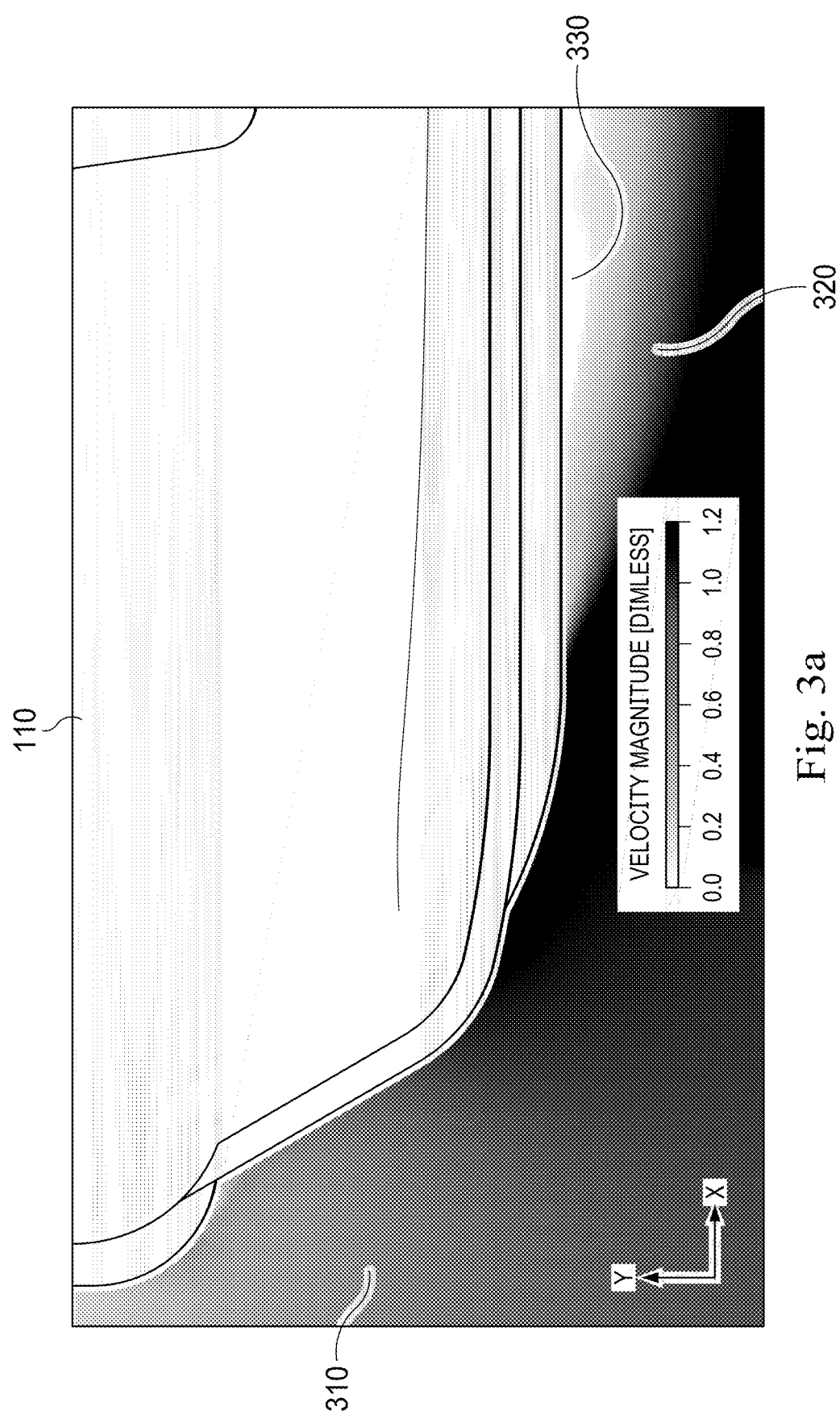
FIG. 3a and FIG. 3b are top views of a velocity field output for a CFD run of an example vehicle, for two different baseline cases, in accordance with at least one embodiment of the present disclosure.
Figure 3B:
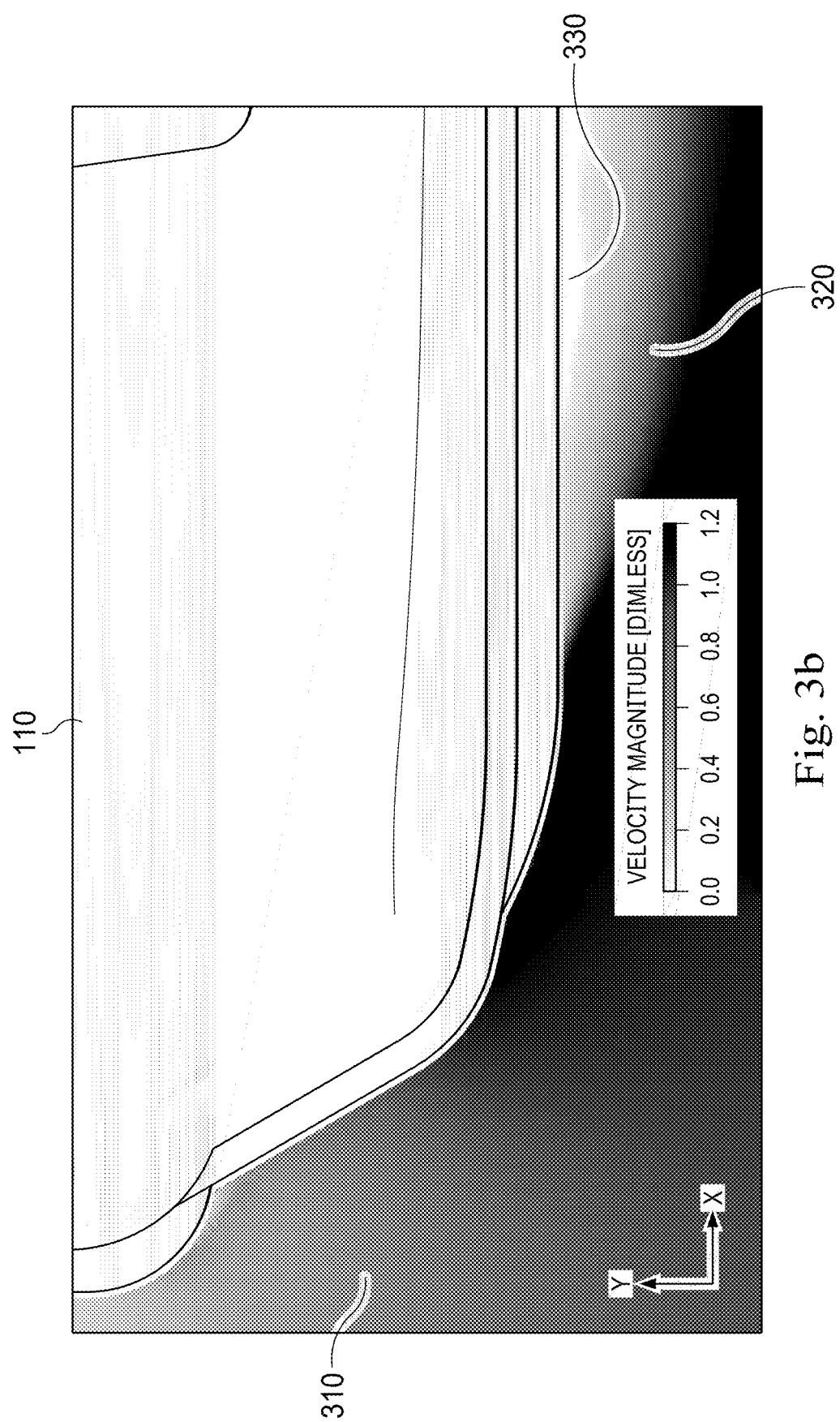

FIG. 3a and FIG. 3b are top views of a velocity field output 310 for a CFD run of an example vehicle 110, for two different baseline cases, in accordance with at least one embodiment of the present disclosure. These two velocity fields or velocity heat maps 310 are similar, but show slight run-to-run differences. For example, visible in each case are two iso lines: a color 1 transition line 320 and a color 2 transition line 330, representing dimensionless velocities of 1.1 and 0.2, respectively, on a scale from 0.0 to 1.2. These two transition lies occur at slightly different places in FIG. 3a vs. FIG. 3b.

Figure 4:
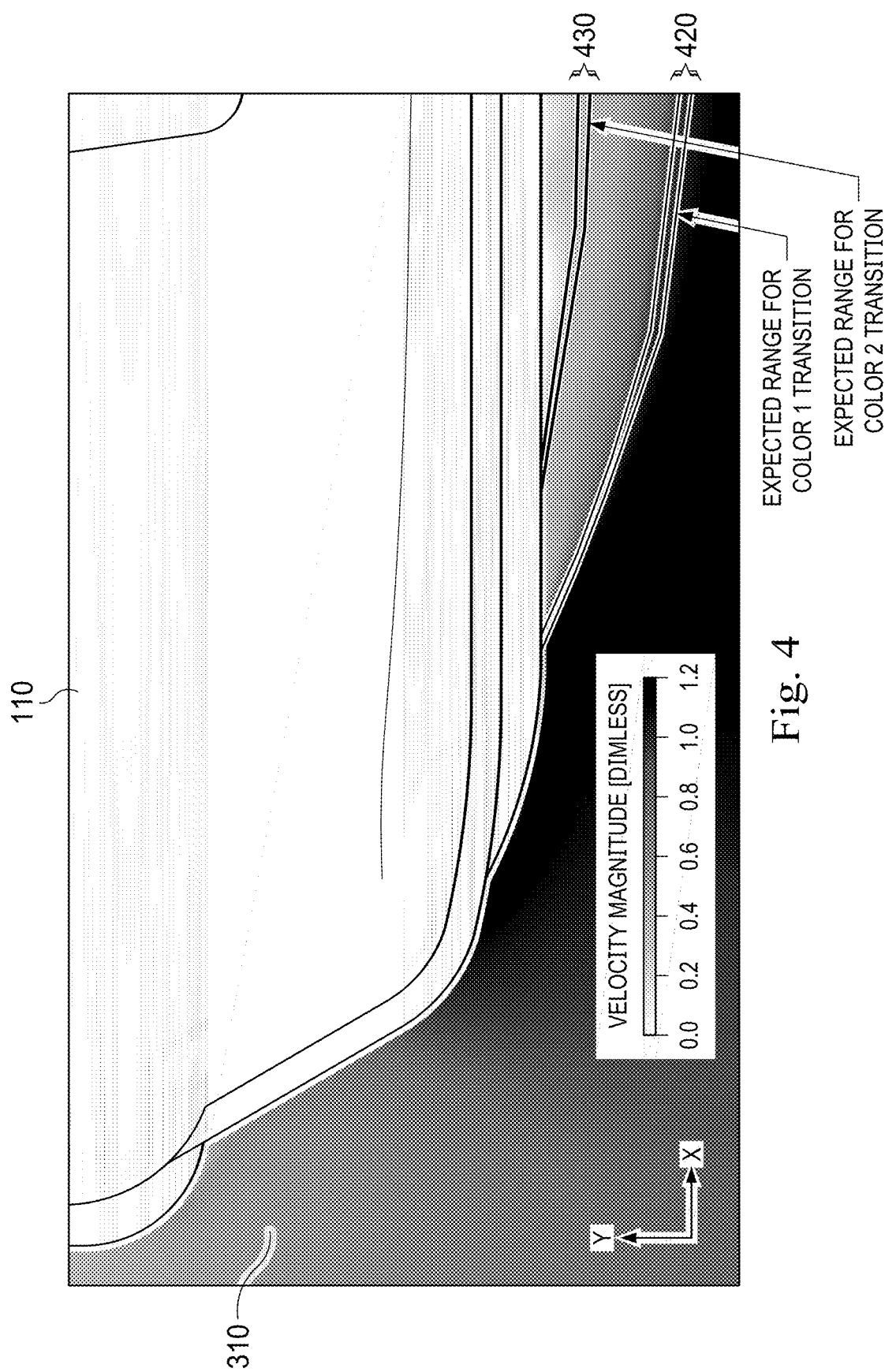
FIG. 4 is a top view of a velocity field output for a CFD run of an example vehicle, in accordance with at least one embodiment of the present disclosure.

FIG. 4 is a top view of a velocity field output or velocity heat map 310 for a CFD run of an example vehicle 110, in accordance with at least one embodiment of the present disclosure. In FIG. 4, a pair of black marker lines 420 have been added to mark the positions of the color 1 transition line 320 in the two baseline runs from FIG. 3a and FIG. 3b. These marker lines 420 and the space between them represent an expected range for the color 1 transition 320 based on the run-to-run variation observed between the two baseline cases. Thus, any change cases (e.g., countermeasure cases), run against the same vehicle with a slightly altered aerodynamic shape, can be evaluated based on whether they show a color 1 transition 320 within this region 420 (in which case the change is not aerodynamically significant in this region), or outside this region 420 (in which case the change has produced a meaningful difference in the velocity field surrounding the vehicle, beyond what would be expected for simple run-to-run variation. Similarly, a pair of marker lines 430 mark the expected range of the color 2 transition 330 as described above. Any change case that produces a color 2 transition iso line 330 outside of this range 430 may be considered aerodynamically meaningful (e.g., by changing the size or shape of the boundary layer 100, which is related to the color 2 transition 330), whereas any change that leaves the color 2 transition 330 within the expected range 430 may be considered aerodynamically insignificant in this region. In some embodiments, insignificant portions of a change run or countermeasure are disregarded, and only significant portions are taken into account. In other embodiments, a change run is considered significant of any portion of any iso line falls outside the expected range for that iso line, but the entire change run is disregarded if no iso line from the change run falls outside the expected range for that iso line.

The minimum number of baseline runs required for the method is two. However, the expected ranges (e.g., expected range 420, expected range 430) can be expanded to include the positions if iso lines from additional baseline runs. An algorithm might determine, for example, that if the addition of a new baseline run changes the position of any point along any expected range, then the number of baseline runs is insufficient and the expected range must be expanded to include the iso lines of the new baseline run, whereas if all points of the iso lines of a new baseline run fall entirely within the expected range, then the number of baseline runs may be deemed sufficient to provide high confidence in the results. Other tests may be performed instead or in addition. For example, the expected range for an iso line could be defined based on an average or mean expectation of the iso lines from multiple baseline runs plus a confidence interval around the average based on a standard deviation (e.g., a 1-sigma, 2-sigma, or 2-sigma confidence interval) of the distances between the mean expectation line and the iso lines for the multiple baseline runs, for each point along the mean expectation line.

Figure 5:
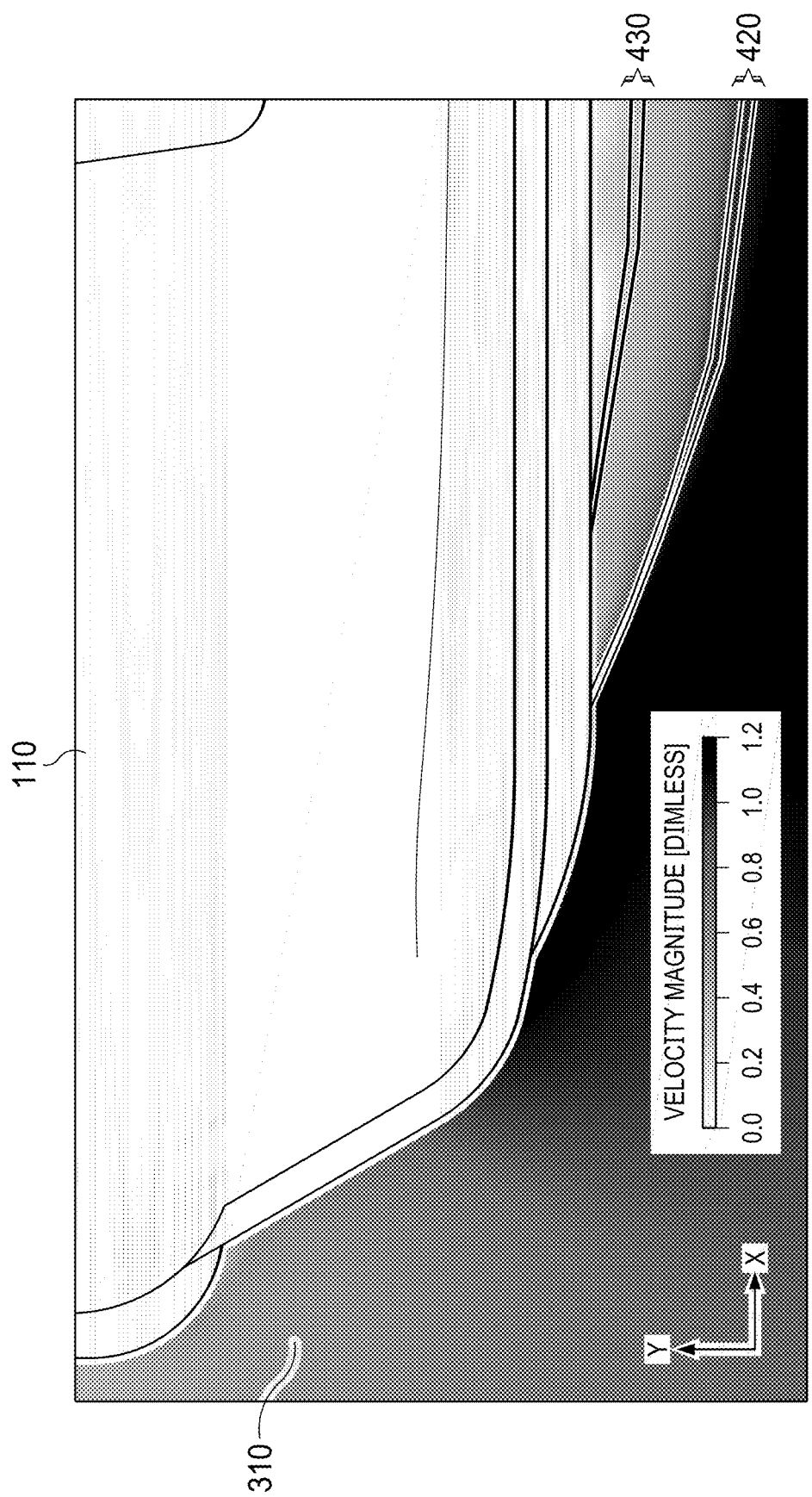
FIG. 5 is a top view of a velocity field output for a CFD run of an example vehicle, in accordance with at least one embodiment of the present disclosure.

FIG. 5 is a top view of a velocity field output or velocity heat map 310 for a CFD run of an example vehicle 110, in accordance with at least one embodiment of the present disclosure. This velocity field or velocity heat map 310 represents a change case. However, as can be seen in the figure, the color 2 transition 330 occurs within the expected range 430, and the color 1 transition 320 occurs within the expected range 420. Therefore, this change case can be classified as aerodynamically insignificant.

Variables that may be plotted and bounded in this way include but are not limited to temperature, static pressure, dynamic pressure, velocity magnitude, velocity components, Lambda2, surface force, density, internal energy, kinetic energy, swirl, and vorticity.

Figure 6:
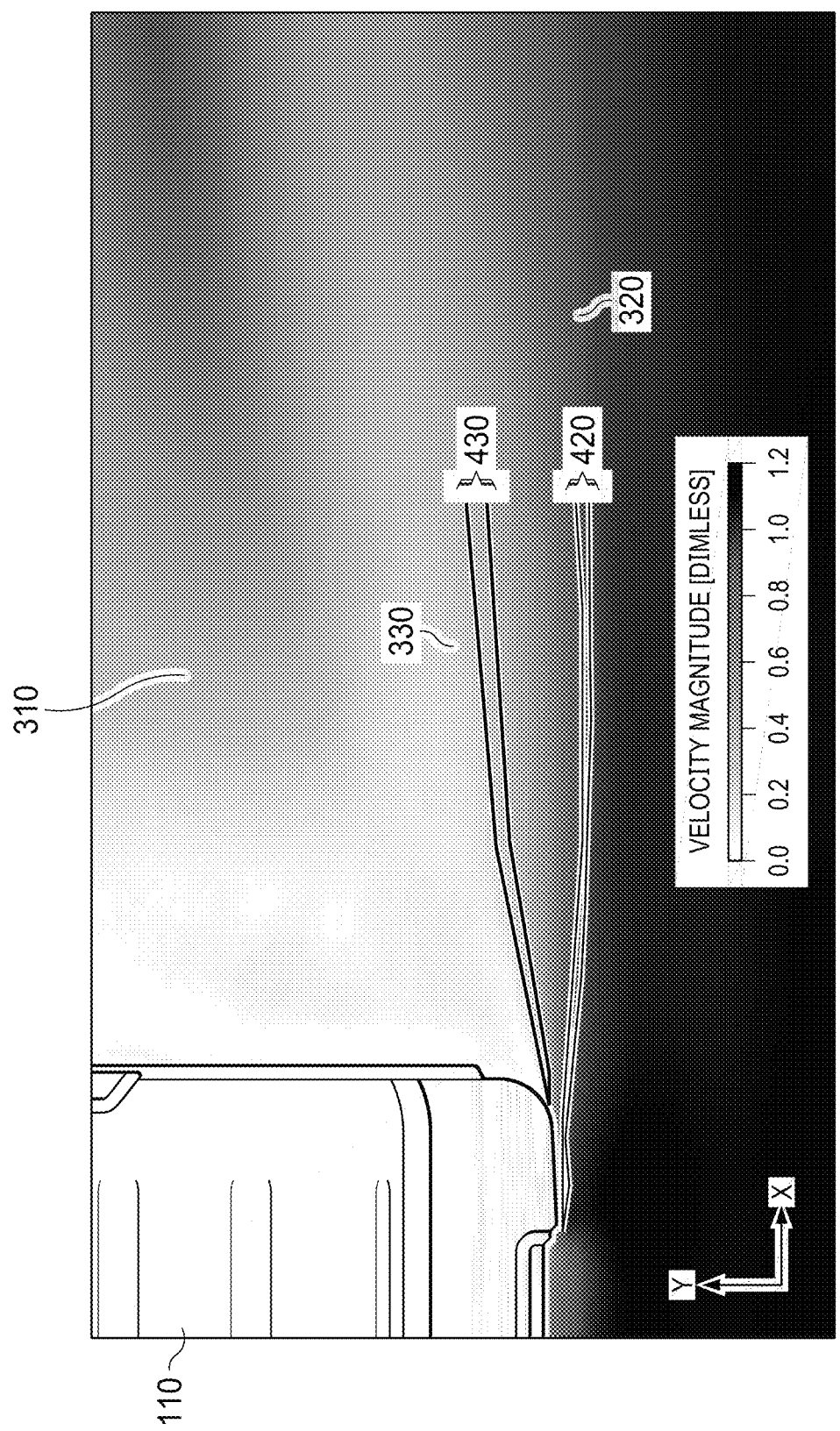
FIG. 6 is a top view of a velocity field output for a CFD run of an example vehicle, in accordance with at least one embodiment of the present disclosure.

FIG. 6 is a top view of a velocity field output 310 for a CFD run of an example vehicle 110, in accordance with at least one embodiment of the present disclosure. In this view of a baseline #3 CFD run, the color 1 transition 320 falls slightly outside the expected range 420, and the color 2 transition 330 falls slightly outside the expected range 430, where the expected ranges were developed from two different baseline runs. The fact that a third baseline run produces transitions 320 and 330 outside of the expected ranges 420 and 430 indicates that more baseline runs are needed in order to define the expected ranges with confidence. In such a case, the expected ranges 420 and 430 are expanded to accommodate the third baseline run, and fourth baseline run can be made. When the transitions 320 and 330 for additional baseline runs no longer fall outside the expected ranges 420 and 430, confidence increases that the expected ranges may be considered adequate.

Figure 7:
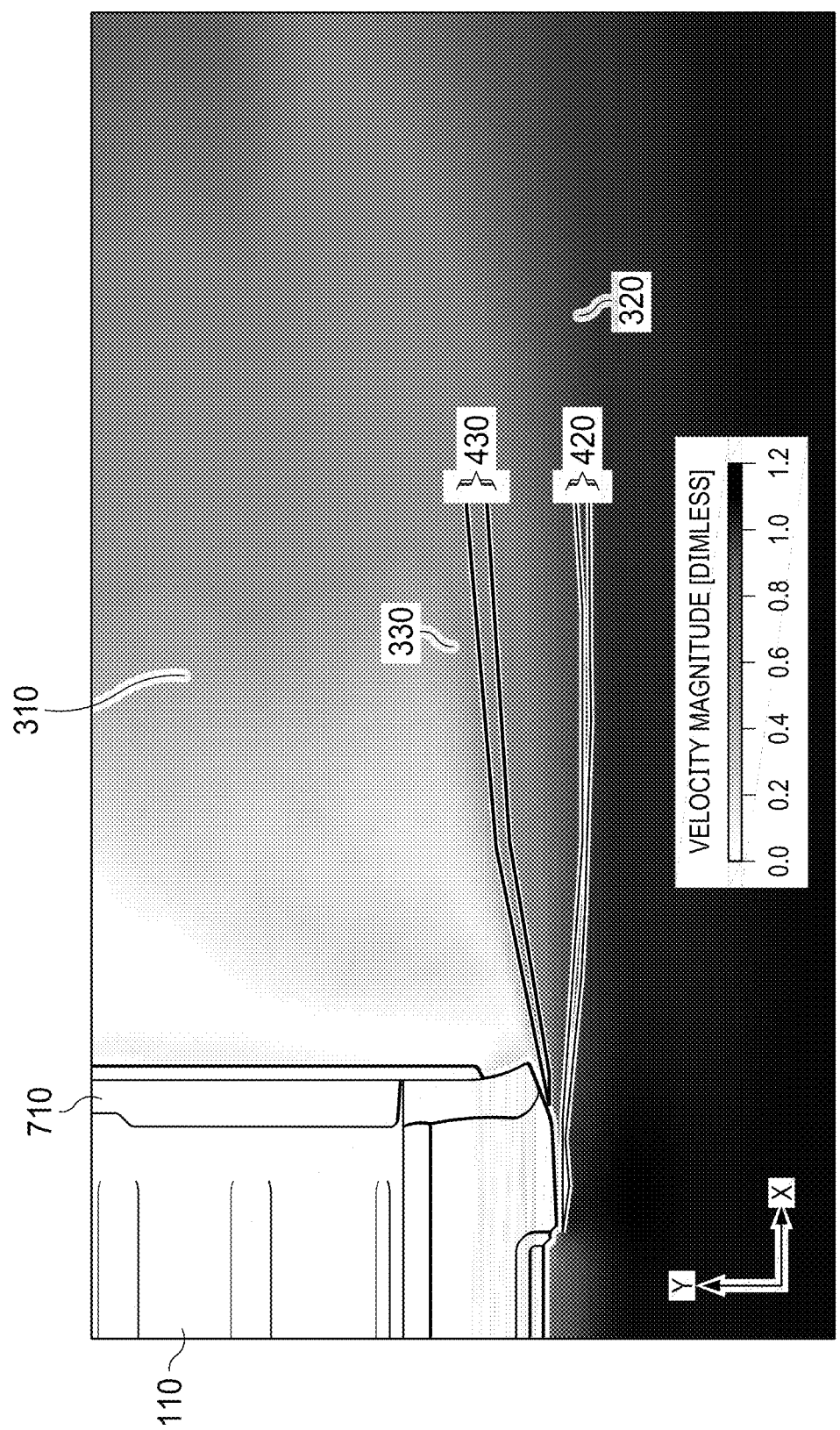
FIG. 7 is a top view of a velocity field output for a CFD run of an example vehicle, in accordance with at least one embodiment of the present disclosure.

FIG. 7 is a top view of a velocity field output 310 for a CFD run of an example vehicle 110, in accordance with at least one embodiment of the present disclosure. In this view of a countermeasure CFD run, an aerodynamic fairing 710 has been added to the rear of the vehicle 110. As a result of this addition, the color 1 transition 320 now falls well outside the expected range 420 and the color 2 transition 330 now falls well outside the expected range 430. According to the method of the present disclosure, this indicates that the addition of the fairing 710 has meaningful aerodynamic effects, beyond what would be expected from run-to-run noise. This comparison may be made visually by a human or algorithmically by a processor or subroutine.

Figure 8:
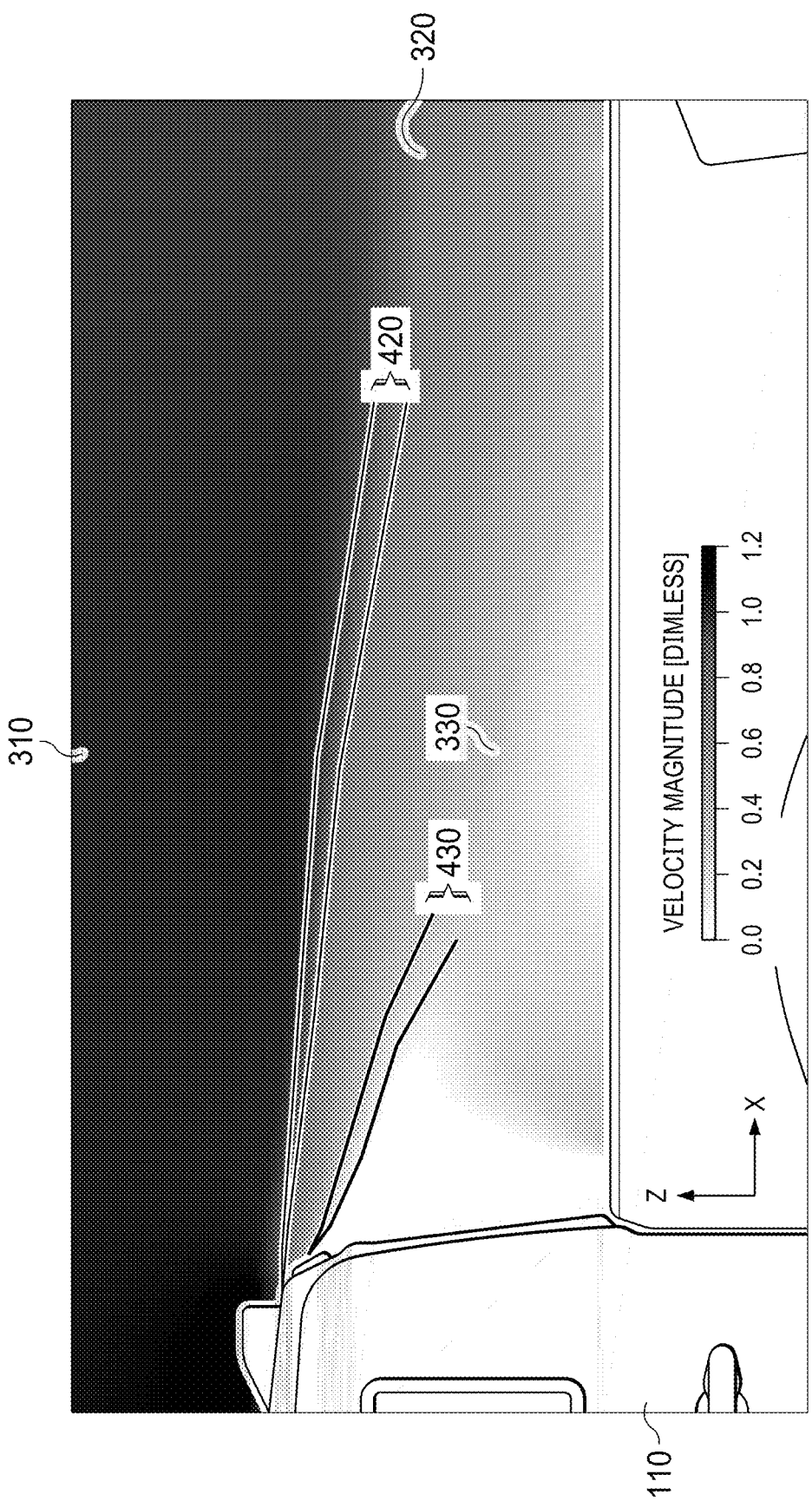
FIG. 8 is a top view of a velocity field output for a CFD run of an example vehicle, in accordance with at least one embodiment of the present disclosure.

FIG. 8 is a top view of a velocity field output 310 for a CFD run of an example vehicle 110, in accordance with at least one embodiment of the present disclosure. In this view of a baseline CFD run, the color 1 transition 320 falls on one edge of the expected range 420, and the color 2 transition 330 falls on one edge of the expected range 430, where the expected ranges were developed from two different baseline runs.

Figure 9:
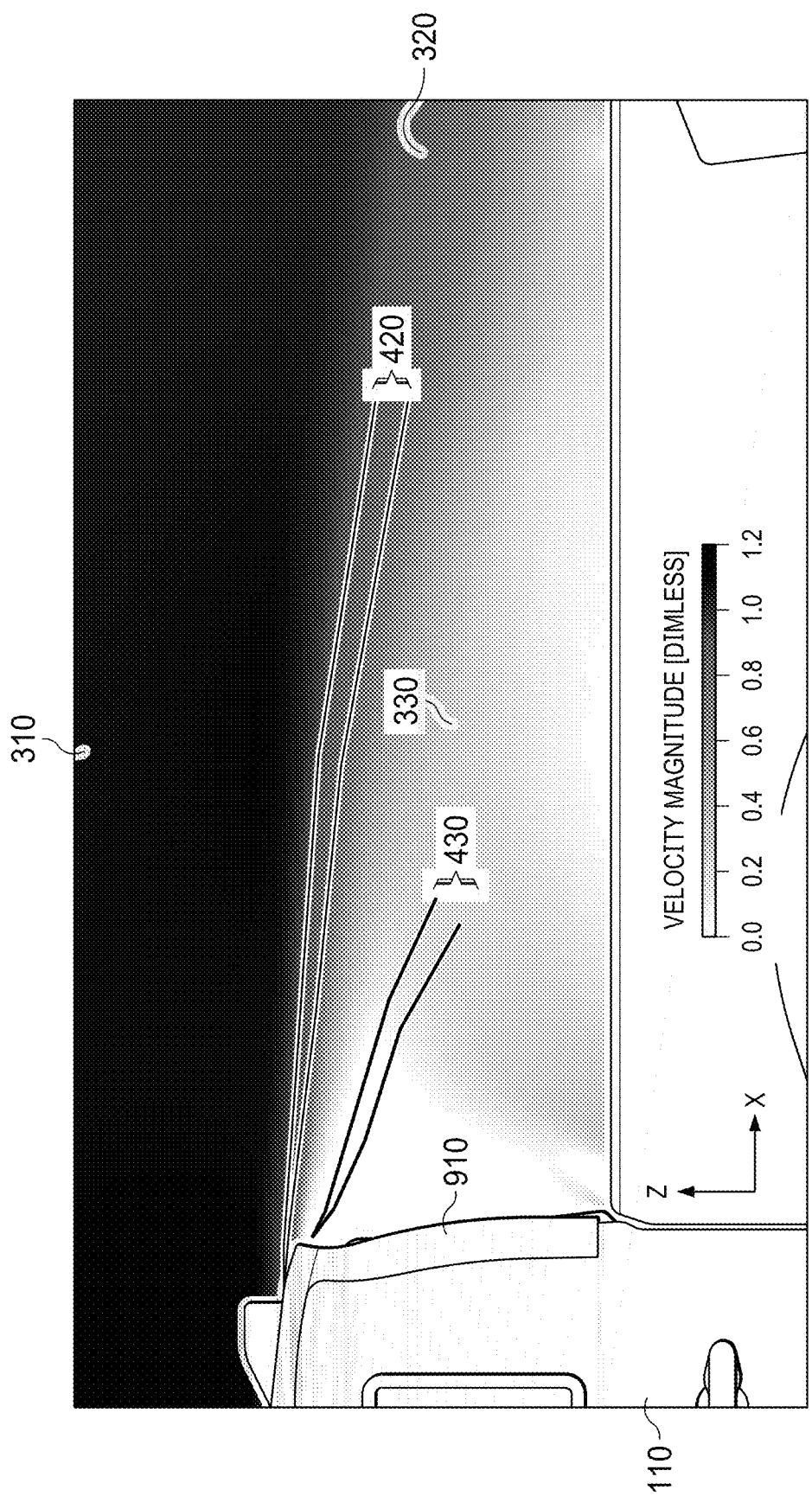
FIG. 9 is a top view of a velocity field output for a CFD run of an example vehicle, in accordance with at least one embodiment of the present disclosure.

FIG. 9 is a top view of a velocity field output 310 for a CFD run of an example vehicle 110, in accordance with at least one embodiment of the present disclosure. In this view of a countermeasure CFD run, an aerodynamic fairing 910 has been added to the rear of the vehicle 110. As a result of this addition, the color 1 transition 320 now falls outside the expected range and the color 2 transition 330 now falls well outside the expected range 430. According to the method of the present disclosure, this indicates that the addition of the fairing 910 has meaningful aerodynamic effects, beyond what would be expected from run-to-run noise.

Figure 10:
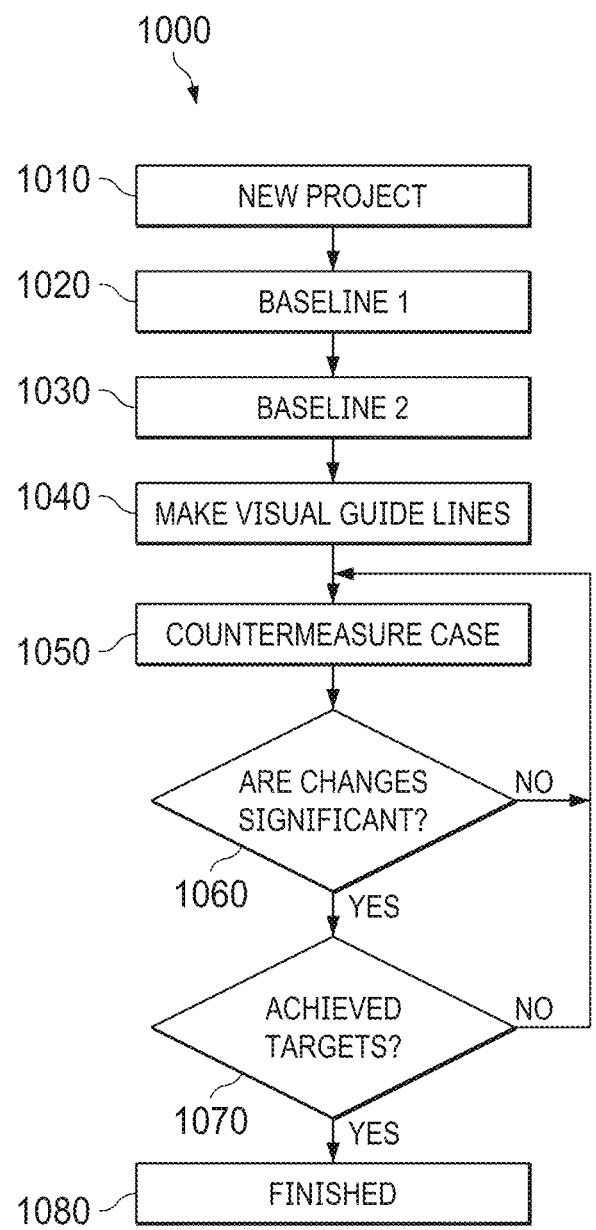
FIG. 10 is a flow diagram of a method for evaluating CFD results, in accordance with at least one embodiment of the present disclosure.

FIG. 10 is a flow diagram 1000 of a method for evaluating CFD results, in accordance with at least one embodiment of the present disclosure. In step 1010, the system begins by receiving from the user a new project involving a vehicle body shape 110 or portion of a vehicle body shape 110 to be simulated, along with a set of initial conditions (e.g., velocity, temperature, air density, etc.)

In step 1020, the method performs a baseline run on the vehicle body shape or portion of a vehicle body shape 110, using the initial conditions.

In step 1030, the method performs a second baseline run on the same vehicle body shape 110, using the initial conditions.

In step 1040, the method creates guide lines marking certain values within the CFD output field (e.g., iso velocity lines or iso pressure lines). This may be done automatically by an algorithm executing on a processor, based on the outputs of the two baseline CFD simulations in accordance with the method.

In step 1050, the system receives from the user a countermeasure case or change case, wherein a change is made to the vehicle body shape 110, and performs a CFD simulation using the same initial conditions as the two baseline cases.

In step 1060, the method determines whether the countermeasure CFD simulation has created flow differences that are outside the expected range of run-to-run variation as defined by the guide lines or iso line boundaries. If the changes are not significant (e.g., the new iso-velocity lines do not fall outside the guide lines or iso line boundaries), then the countermeasure is adjusted, and the method returns to step 1050. If the changes are significant, the method moves on to step 1070.

In step 1070, the system determines whether design targets have been achieved (e.g., drag reduction targets for a vehicle body shape 110). If the targets have not been achieved, then the countermeasure is adjusted, and the method returns to step 1050. If the design targets have been met, the method proceeds to step 1080 and is finished, with the final output being the change in vehicle body shape that achieves the design targets. This vehicle bpdy shape is then accepted as final.

Accordingly, it can be seen that the CFD iso line boundary method fills a long-standing need in the art, by providing a method for engineers to quickly evaluate CFD results to determine whether they are meaningful results that exceed run-to-run noise, or whether they are relatively meaningless or trivial results that fall within the expected range of run-to-run noise.

The processor (including a user interface) may comprise any combination of general-purpose computing devices, reduced instruction set computing (RISC) devices, application-specific integrated circuits (ASICs), field programmable gate arrays (FPGAs), or other related logic devices, including mechanical and quantum computers. In some embodiments, the processor comprises a memory in which instructions or information are stored, and the processor operates based on the instructions or information. The memory may be co-located on the same board or chip with processing elements or else located external to a board or chip containing processing elements. The memory may comprise any combination of read-only memory (ROM), programmable read-only memory (PROM), electrically erasable read-only memory (EEPROM), magnetic or electronic random access memory (RAM), flash memory, disk or tape drive, or other related memory types.

External communication (including but not limited to software updates, firmware updates, or outputs of the simulation) to and from the processor could be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information.

Internal communication within the processor may be through numerous methods or protocols. Serial communication protocols may include but are not limited to SPI, I$^2$C, RS-232, RS-485, CAN, Ethernet, ARINC 429, MODBUS, MIL-STD-1553, or any other suitable method or protocol. Parallel protocols including but not limited to ISA, ATA, SCSI, PCI, IEEE-488, IEEE-1284, and other suitable protocols. Where appropriate, serial and parallel communications may be bridged by a UART, USART, or other appropriate subsystem.

A number of variations are possible on the examples and embodiments described above. For example, other variables may be simulated and analyzed than those described above.

Alternatively, the technology described herein may be employed for other types of vehicles, including but not limited to aircraft and watercraft. The logical operations making up the embodiments of the technology described herein are referred to variously as operations, steps, objects, elements, components, or modules. Furthermore, it should be understood that these may occur in any order, unless explicitly claimed otherwise or a specific order is inherently necessitated by the claim language.

In some implementations, the simulation and its outputs may be two-dimensional. In other embodiments, the simulation and its outputs may be three dimensional or multidimensional. It should further be understood that the described technology may be employed with processors of diverse type, and displays including 2D, 3D, VR, AR, color, and monochrome displays.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the CFD iso line boundary method. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the CFD iso line boundary method as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A computer-implemented method for evaluating computational fluid dynamic simulation results, the method comprising:
   with a processor comprising a memory:
      receiving a set of initial conditions;
      based on the set of initial conditions, automatically performing a first baseline run with a computational fluid dynamics solver of a simulated area or volume containing a first vehicle body shape and, with the same computational fluid dynamics solver and the same set of initial conditions, performing a second baseline run of the simulated area or volume containing the same first vehicle body shape;
      with the same computational fluid dynamics solver and based on the same set of initial conditions, automatically performing a change run of the simulated area or volume containing a second vehicle body shape; and
   within the simulated area or volume:
      automatically plotting an iso line of the first baseline run and a corresponding iso line of the second baseline run within a scalar variable map of at least a portion of the simulated area or volume;
      automatically plotting an iso line of the change run within the scalar variable map, wherein the iso line of the change run corresponds to the iso line of the first baseline run and the iso line of the second baseline run; and
      automatically comparing the iso line of the change run to the iso line of the first baseline run and the iso line of the second baseline run,
      wherein a difference between the first baseline run and the second baseline run provides information regarding stochastic run-to-run noise variability of the computational fluid dynamic simulation results introduced by the computational fluid dynamics solver,
      wherein the change run obviates the need for testing of a second physical model of the second vehicle body shape, and
      wherein an iso line is a line on a map or chart along which there is a constant value.

2. The method of claim 1, further comprising, based on the comparing:
   automatically accepting the second vehicle body shape as significant if at least part of the iso line of the change run does not fall between the iso line of the first baseline run and the iso line of the second baseline run; and
   automatically rejecting the second vehicle body shape as insignificant if the iso line of the change run falls entirely between the iso line of the first baseline run and the iso line of the second baseline run.

3. The method of claim 2, further comprising automatically accepting the second vehicle body shape as final if an output of the change run meets a design criterion.

4. The method of claim 1, wherein the scalar variable map is a map of scalar values of at least one of temperature, static pressure, dynamic pressure, velocity magnitude, a velocity component, Lambda2, surface force, density, internal energy, kinetic energy, swirl, or vorticity, or any combination thereof.

5. A computer-implemented method for evaluating computational fluid dynamic simulation results, the method comprising:
   providing a first vehicle body shape or portion of a vehicle body shape to be simulated;
   providing a set of initial conditions;
   with a processor comprising a memory:
      with a computational fluid dynamics solver, automatically performing at least three baseline runs of a simulated area or volume containing the first vehicle body shape using the set of initial conditions;
      with the same computational fluid dynamics solver and the same set of initial conditions, automatically performing a change run of the simulated area or volume containing a second vehicle body shape using the set of initial conditions; and
   for each point within a scalar variable map of at least a portion of the simulated area or volume:
      automatically defining a mean expectation line of averages of an iso line from each of the at least three baseline runs, and plotting a confidence interval around the mean expectation line;

automatically plotting an iso line of the change run that corresponds to the iso lines from each of the at least three baseline runs; and automatically comparing the iso line of the change run to the confidence interval, wherein a difference between the first baseline run and the second baseline run provides information regarding stochastic run-to-run noise variability of the computational fluid dynamic simulation results introduced by the computational fluid dynamics solver, wherein the change run obviates the need for testing of a second physical model of the second vehicle body shape, and wherein an iso line is a line on a map or chart along which there is a constant value.

6. The method of claim 5, further comprising, based on the comparing:

automatically accepting the second vehicle body shape as significant if at least part of the iso line of the change run does not fall within the confidence interval; and automatically rejecting the second vehicle body shape as insignificant if the iso line of the change run falls entirely outside the confidence interval.

7. The method of claim 6, further comprising, if the second vehicle body shape is accepted as significant, automatically accepting the second vehicle body shape as a final output if an output of the change run meets a design target.

8. The method of claim 5, wherein the confidence interval is defined as the absolute value of the greatest distance between the mean expectation line and any of the averaged iso lines.

9. The method of claim 5, wherein the confidence interval is defined as plus or minus an absolute value of a standard deviation of distances between the mean expectation line and the averaged iso lines.

10. The method of claim 5, wherein the confidence interval is defined as plus or minus two times an absolute value of a standard deviation of distances between the mean expectation line and the averaged iso lines.

11. The method of claim 5, wherein the confidence interval is defined as plus or minus three times an absolute value of a standard deviation of distances between the mean expectation line and the averaged iso lines.

12. The method of claim 5, wherein the scalar variable map is a map of scalar values of at least one of temperature, static pressure, dynamic pressure, velocity magnitude, a velocity component, Lambda2, surface force, density, internal energy, kinetic energy, swirl, or vorticity, or any combination thereof.

13. A system for testing the fluid dynamic characteristics of body shapes of a vehicle, the system comprising:

a processor comprising:
 a memory;
 a display; and
 a user interface configured to receive inputs from a user, wherein the processor is configured to:
 receive a first body shape of a vehicle to be simulated;
 receive a set of initial conditions;
 with a computational fluid dynamics solver, automatically perform at least two baseline runs of a simulated area or volume containing the first body shape of the vehicle using the set of initial conditions;

with the same computational fluid dynamics solver and the same set of initial conditions, automatically perform a change run of the simulated area or volume using a second vehicle body shape using the set of initial conditions; and for each point within a scalar variable map of at least a portion of the simulated area or volume:
 automatically define a mean expectation line of averages of an iso line from each of the at least two baseline runs, and plot a confidence interval around the mean expectation line;
 automatically plot an iso line of the change run that corresponds to the iso lines from each of the at least two baseline runs; and
 automatically compare the iso line of the change run to the confidence interval wherein the first baseline run obviates the need for testing of a first physical model of the first vehicle body shape, wherein a difference between the first baseline run and the second baseline run provides information regarding stochastic run-to-run noise variability of the computational fluid dynamic simulation results introduced by the computational fluid dynamics solver, wherein the change run obviates the need for testing of a second physical model of the second vehicle body shape, and wherein an iso line is a line on a map or chart along which there is a constant value.

14. The system of claim 13, wherein the processor is further configured to, based on the comparing:

automatically accept the second vehicle body shape as significant if at least part of the iso line of the change run does not fall within the confidence interval; and automatically reject the second vehicle body shape as insignificant if the iso line of the change run falls entirely outside the confidence interval.

15. The system of claim 14, wherein the processor is further configured to, if the second vehicle body shape is accepted as significant, automatically accept the second vehicle body shape as a final output if an output of the change run meets a design target.

16. The system of claim 13, wherein the confidence interval for each point along the mean expectation line is defined as the absolute value of the greatest distance between the mean expectation line and any of the averaged iso lines.

17. The system of claim 13, wherein the confidence interval for each point along the mean expectation line is defined as plus or minus an absolute value of a standard deviation of distances between the mean expectation line and the averaged iso lines.

18. The system of claim 13, wherein the confidence interval for each point along the mean expectation line is defined as plus or minus two times an absolute value of a standard deviation of distances between the mean expectation line and the averaged iso lines.

19. The system of claim 13, wherein the confidence interval for each point along the mean expectation line is defined as plus or minus three times an absolute value of a standard deviation of distances between the mean expectation line and the averaged iso lines.

20. The system of claim 13, further comprising the vehicle.

* * * * *